United States Patent [19]
Horiuchi

[11] Patent Number: 5,121,722
[45] Date of Patent: Jun. 16, 1992

[54] COMBUSTION CHAMBER DEFINING PISTON FOR AN INTERNAL COMBUSTION ENGINE

[75] Inventor: Shigeaki Horiuchi, Fujisawa, Japan
[73] Assignee: Isuzu Motors Ltd., Tokyo, Japan
[21] Appl. No.: 687,131
[22] Filed: Apr. 18, 1991
[51] Int. Cl.⁵ .......................... F02B 23/06; F02F 3/26
[52] U.S. Cl. ..................... 123/276; 123/261; 123/263; 123/193.6
[58] Field of Search ............... 123/276, 279, 293, 261, 123/262, 263, 193 P; 92/187

[56] References Cited

U.S. PATENT DOCUMENTS

| | | | |
|---|---|---|---|
| 2,662,510 | 12/1953 | French | 123/261 |
| 2,870,754 | 1/1959 | Morris | 123/263 |
| 5,000,144 | 3/1991 | Schweinzer et al. | 123/263 |

FOREIGN PATENT DOCUMENTS

| | | | |
|---|---|---|---|
| 0661891 | 6/1938 | Fed. Rep. of Germany | 123/293 |
| 0676997 | 6/1939 | Fed. Rep. of Germany | 123/276 |
| 3720865 | 1/1989 | Fed. Rep. of Germany | 123/279 |
| 0553161 | 12/1956 | Italy | 123/276 |

*Primary Examiner*—Andrew M. Dolinar
*Assistant Examiner*—M. Macy
*Attorney, Agent, or Firm*—John E. Toupal; Harold G. Jarcho

[57] ABSTRACT

A piston for use in an internal combustion engine and including a central portion; a side wall portion adapted for sliding engagement with a cylinder; a connector end adapted for connection with a connecting rod; and a driven end adapted to receive combustion generated forces. The driven end defines a primary chamber adapted to receive fuel and accommodate combustion thereof; and the central body portion defines an auxiliary chamber, an inlet port providing a fuel injection path between the primary and auxiliary chambers, and outlet port means providing between the auxiliary and primary chambers a discharge path for combustion products generated by combustion in the auxiliary chamber.

11 Claims, 4 Drawing Sheets

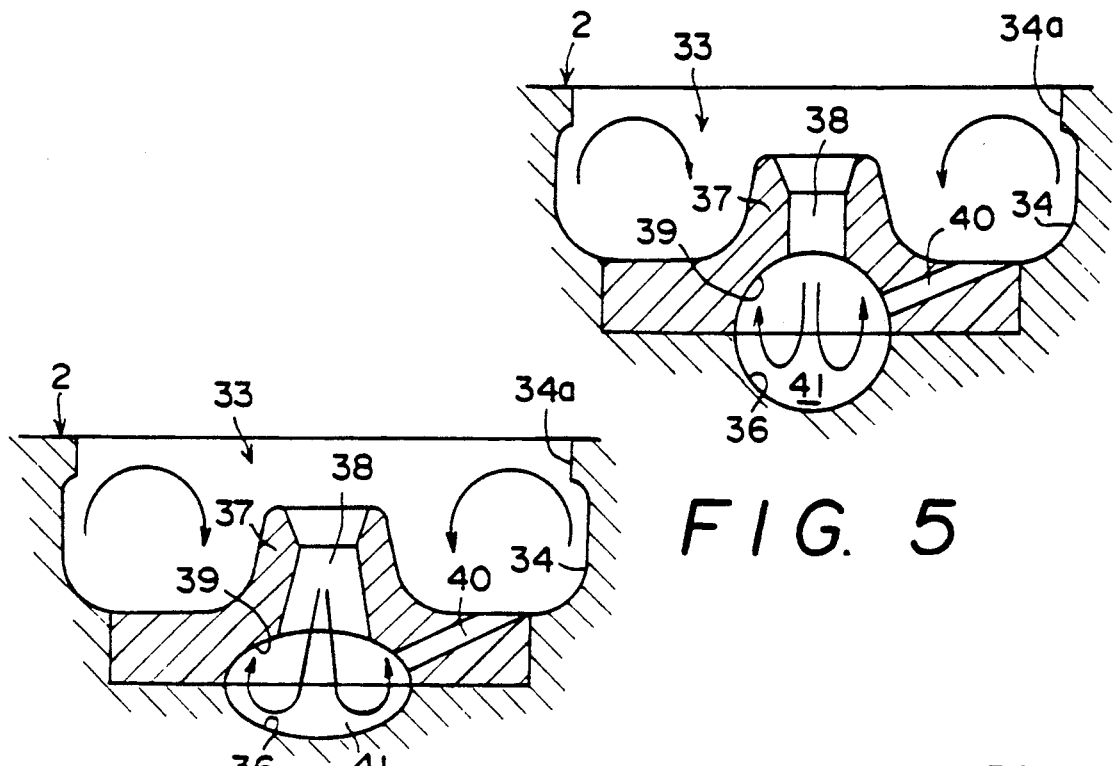
FIG. 5
FIG. 6
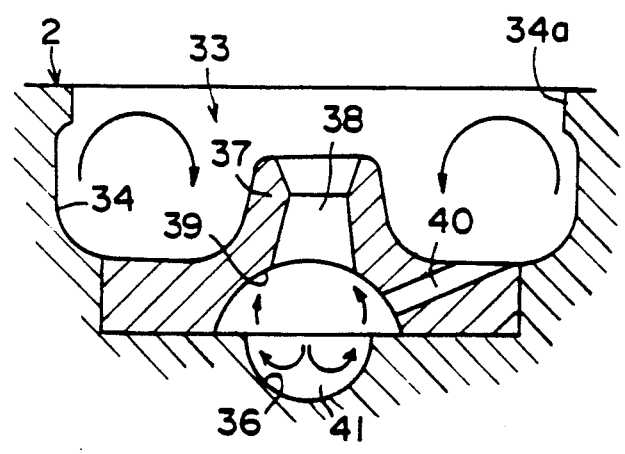
FIG. 7

5,121,722

COMBUSTION CHAMBER DEFINING PISTON FOR AN INTERNAL COMBUSTION ENGINE

BACKGROUND OF THE INVENTION

The present invention relates generally to a piston defining a combustion chamber for an internal combustion engine and, more particularly, to such a device in which fuel is effectively mixed to activate the combustion state at a latter period of combustion.

As shown in FIGS. 9 and 10, in a combustion chamber 22 of a conventional internal combustion engine, peripheral wall 24 provides a substantially square contour in the center of a crown portion of a piston 2. An upwardly projecting conical portion 26 is provided at the center of a bottom wall 25, and the peripheral wall 24 has a narrowed edge portion 23. Fuel is injected obliquely from the center on the upper side of the combustion chamber 22 against the square peripheral wall 24. Such a combustion chamber for an internal combustion engine as described, for example, in Japanese Patent Laid-Open No. 62-157221.

In the aforementioned construction, a change in time of the combustion cycle is represented by a crank angle, as indicated by curve 29 in FIG. 11. The heat generation rate existing while fuel moves in an intake swirl x at an initial period of combustion is high, whereas at a latter period of the combustion cycle, fuel impinges upon the peripheral wall 24 of the combustion chamber 22 and is adhered thereto completely unburned. Therefore, the heat generation rate is reduced significantly. During the initial period of the aforementioned combustion cycle, excessive heat is generated to cause engine knocks, whereas during the latter period of combustion when lesser amounts of heat are generated, black smoke resulting from incomplete combustion of fuel is produced. Injection of fuel under high pressure is effective to reduce the rate of black smoke production but it also tends to increase engine knock. Consequently, it is difficult to simultaneously limit both engine knock and the production of undesirable black smoke. Improved performance would be obtained by increasing combustion during the latter period of the combustion cycle as indicated by line 30 in FIG. 11.

It is the object of the present invention, therefore, to provide a combustion chamber defining piston for an internal combustion engine which can disturb the motion of combustion gases or flame to promote the combustion of fuel.

SUMMARY OF THE INVENTION

The invention is a piston for use in an internal combustion engine and including a central body portion; a side wall portion adapted for sliding engagement with a cylinder; a connector end adapted for connection with a connecting rod; and a driven end adapted to receive combustion generated forces. The driven end defines a primary chamber adapted to receive fuel and accommodate combustion thereof; and the central body portion defines an auxiliary chamber, an inlet port providing a fuel injection path between the primary and auxiliary chambers, and outlet port means providing between the auxiliary and primary chambers a discharge path for combustion products generated by combustion in the auxiliary chamber. Gases directed through the outlet port means remove unburned fuel from wall surfaces of the primary chamber to improve the combustion process.

According to particular features of the invention, the primary chamber is partially defined by a cylindrical wall portion, the inlet port extends between a central portion of the primary chamber and a central portion of the auxiliary chamber, the outlet port means comprises a plurality of outlet ports disposed to discharge combustion products from said auxiliary chamber and obliquely toward the cylindrical wall portion. This arrangement facilitates the removal of unburned fuel from the cylindrical wall portion.

According to other features of the invention, the central body portion comprises an inner body portion formed integrally with the side wall portion and an insert portion detachably joined to the inner body portion and having one surface partially defining the primary chamber and another surface partially defining the auxiliary chamber. These features provide the desired primary and auxiliary chambers in an efficient structural arrangement.

DESCRIPTION OF THE DRAWINGS

These and other objects and features of the invention will become more apparent upon a perusal of the following description taken in conjunction with the accompanying drawings wherein:

FIGS. 4 to 7 are front sectional views showing modified combustion chamber embodiments of the invention;

DESCRIPTION OF THE PREFERRED EMBODIMENTS

Figure 1:
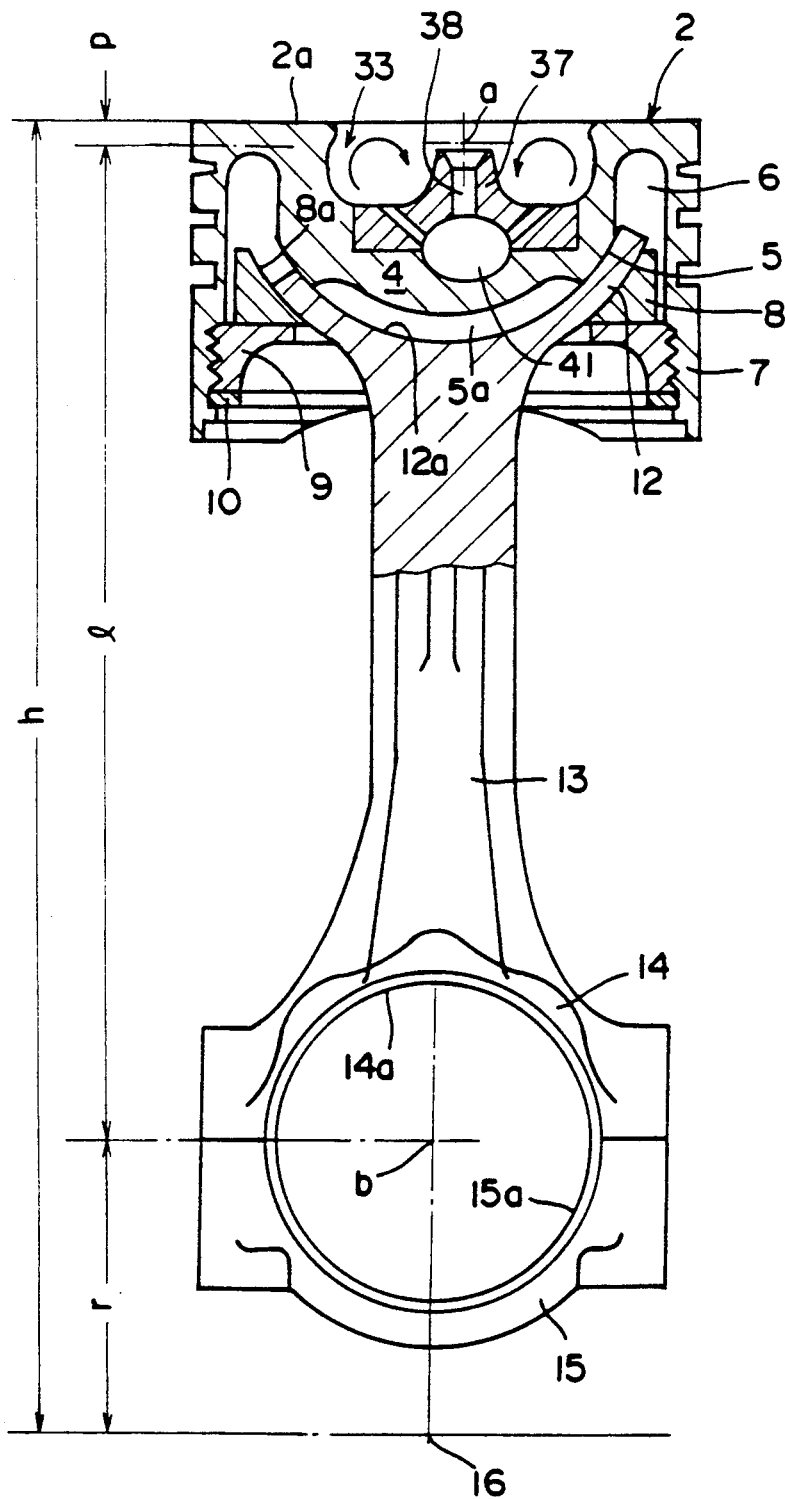
FIG. 1 is a front sectional view of a piston and a connecting rod according to the invention.

FIG. 1 illustrates a connecting rod and piston assembly of the present invention. A piston 2 in, for example, a Diesel engine includes a combustion chamber 33 formed by a cavity provided in a crown surface 2a. Piston rings (not shown) can be mounted in an outer peripheral wall of the piston 2 and the interior of a skirt portion 7 typically is hollow.

The crown portion of the piston 2 defines a convex portion 4 provided with a downwardly projecting spherical surface 5. The periphery of the convex portion 4 provides an annular space 6 adapted to be filled with lubricating oil for cooling. In addition, the spherical surface 5 of the convex portion 4 is provided with a depression 5a for retaining oil for cooling and lubrication. A bowl-shaped receiving plate 12 is formed integrally with an extreme end of a connecting rod 13. Slidably engaging the spherical surface 5 is a spherically shaped concave portion 12a on a receiving plate 12.

An annular retainer member 8 having a spherically shaped concave portion 8a engages a back surface of the receiving plate 12 to maintain engagement between the convex portion 4 and the receiving plate 12. The retainer member 8 is supported by a tubular nut 9 threadedly engaged with the skirt portion 7. Securing the nut 9 is a split retaining ring 10 engaged with the skirt portion 7.

An axial portion at the extreme end of an arm of a crank shaft 16 (represented by an axial center) is connected between a semicircular depression 14a at the base end 14 of the connecting rod 13 and a semicircular depression 15a of a bearing cap 15 similar to the prior art. The receiving plate 12 at the extreme end of the connecting rod 13 supports the convex portion 4 of the crown portion and oscillates as the crank shaft 16 rotates.

According to the above-described construction, the concave portion 12a of the receiving plate 12 of the connecting rod 13 is engaged with the convex portion 4 of the piston's crown portion so that the concave portion 12a may be oscillated. Therefore, as compared with a conventional pin connection construction, the center a of oscillation of the connecting rod 13 is moved considerably closer to the crown surface 2a and, in addition, a deep combustion chamber 33 can be disposed in the crown portion of the piston 2. Furthermore, a dimension p between a center of oscillation and the crown surface 2a is reduced so that when an arm (length r) of the crank shaft 16 is extended through that reduced amount, the stroke of the piston 2 is increased, and piston displacement also is increased without changing a height h of a cylinder body.

Figure 2:
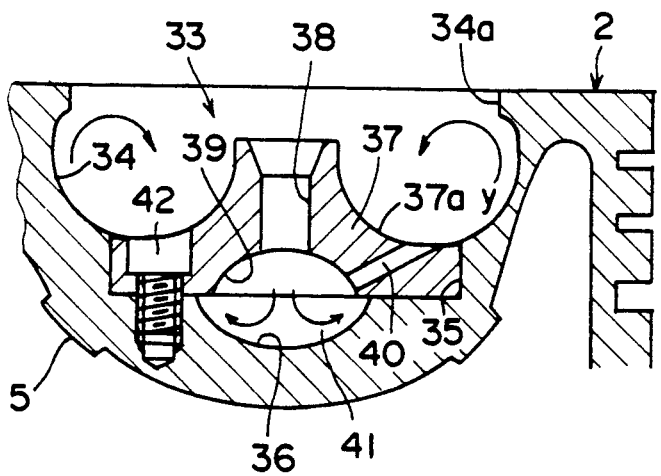
FIG. 2 is a partial front sectional view illustrating a combustion chamber according to the invention.
Figure 3:
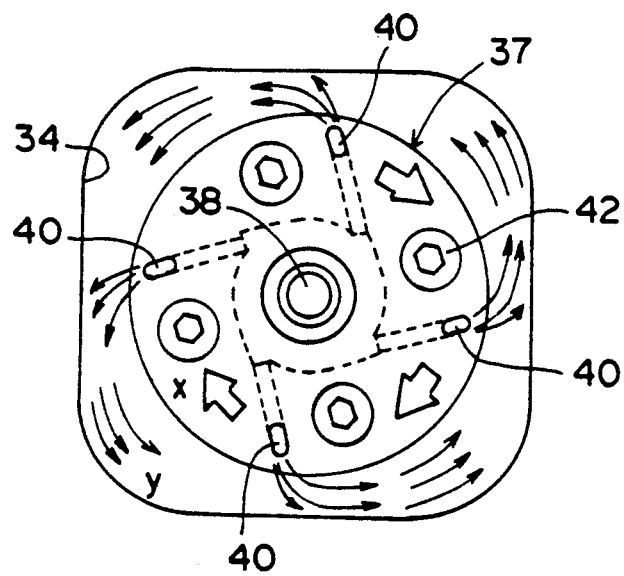
FIG. 3 is a plan view of the chamber shown in FIG. 2.

Illustrated in FIGS. 2 and 3 is a primary combustion chamber 33 defined by a cylindrical wall portion 34 formed in a crown portion of a piston 2. An inwardly directed rim portion 34a slightly narrows the combustion chamber 33. At the bottom of the combustion chamber 33 is a shallow circular recess 35 formed in an inner body portion and having a surface interrupted by a concave surface defining a cavity 36. An insert 37 having an upwardly projecting conical column is fitted into the recess 35 and is secured to the inner piston body portion by a plurality of bolts 42.

One surface 37a of the insert 37 partially defines the primary chamber 33 while another inner surface defines a concave cavity 39 communicating with the cavity 36. Together, the first cavity 39 and the second cavity 36 form an auxiliary combustion chamber 41. A fuel injection path is provided by an inlet port 38 formed in the upwardly projecting column portion of the insert 37 and communicating between the central portions of the primary chamber 33 and the auxiliary chamber 41. Also formed in the insert 37 are a plurality of outlet ports 40 that provide discharge paths between the auxiliary chamber 41 and the primary chamber 33. The outlet ports 40 are directed obliquely to the wall portion 34 of the combustion chamber 33. More specifically, the bottom wall 37a of the insert member 37 is so shaped that combustion gases are directed obliquely against the cylindrical wall portion 34.

Figure 9:
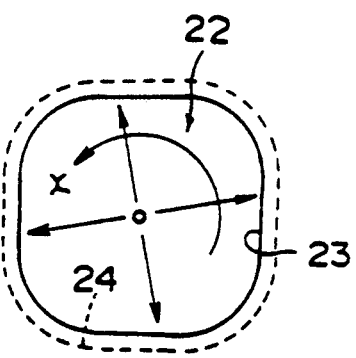
FIG. 9 is a bottom view showing a combustion chamber of a conventional internal combustion engine.
Figure 11:
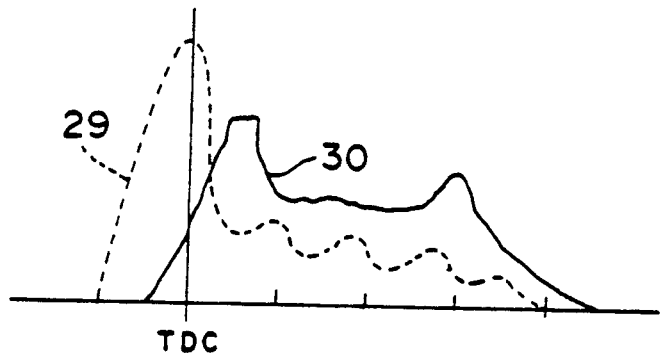
FIG. 11 is a diagram illustrating characteristics of a combustion cycle.
Figure 10:
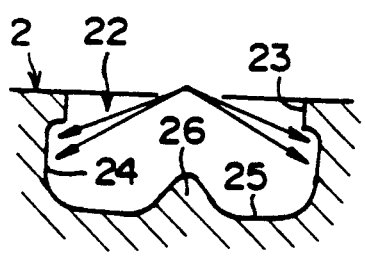
FIG. 10 is a front sectional view of the chamber shown in FIG. 9.

During operation of the present invention, fuel first is injected from a plurality of jets of a fuel injection nozzle (not shown) disposed above the piston 2 toward the wall portion 34 of the combustion chamber 33 (refer FIGS. 9 and 10). Subsequently, fuel from the fuel injection nozzle is injected into the auxiliary chamber 41 via the inlet port 38 in the insert member 37. Before reaching the peripheral wall portion 34, a portion of the injected fuel is mixed with air in the primary chamber 33 and that mixture is fired and burned. The remaining fuel adheres to the peripheral wall portion 34.

Fuel injected from the fuel injection nozzle to the auxiliary chamber 41 via the inlet port 38 is burned and the resulting combustion product gases are discharged through the outlet ports 40. Those gases whirl along the peripheral wall portion 34 as indicated by an arrow y (in a direction opposite to an intake swirl x) as a whole. The fuel adhering to the peripheral wall portion 34 is rapidly removed by the combustion gases which flow along the surface of the peripheral wall portion 34 from the auxiliary chamber 41. After being removed by the gases the fuel is mixed with air and burned. Therefore, the level of combustion at the latter period of the combustion cycle is increased in comparison with the prior art to reduce black smoke in the exhaust gases.

As shown in FIGS. 5 and 6, the shape of the auxiliary chamber 41 may be of spherical or oval section. In order to increase the volume of the auxiliary chamber 41, the inside diameter of the cavity 36 in the inner piston body portion may be made larger than that of the cavity 39 in the insert member 37 as shown in FIG. 2, or, if the inner body portion has not enough wall thickness, the inside diameter of the cavity 36 may be made smaller than that of the cavity 39 in the insert member 37 as shown in FIG. 7. In the latter case, fuel and air in the auxiliary chamber 41 are effectively stirred due to the presence of a difference in the interface between the cavity 36 and the cavity 39.

Figure 4:
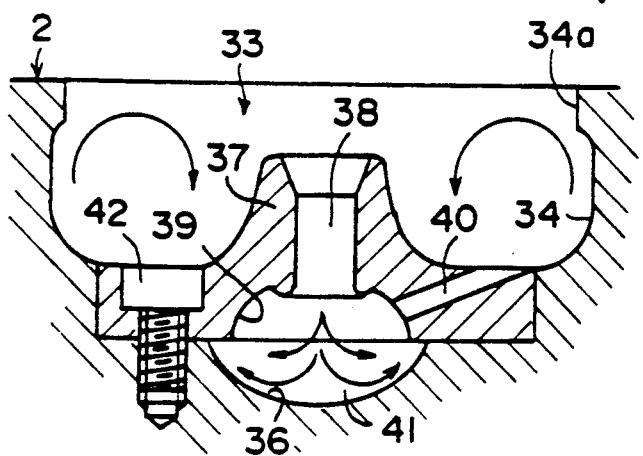

The inlet 38 port can have a shape such that its inner end is expanded into the cavity 39, as shown in FIG. 4, or its inner end is enlarged in a tapered fashion into the auxiliary chamber 41, as shown in FIGS. 6 and 7. With those arrangements, fuel and air can be well mixed even in a relatively flat auxiliary chamber 41.

Figure 8:
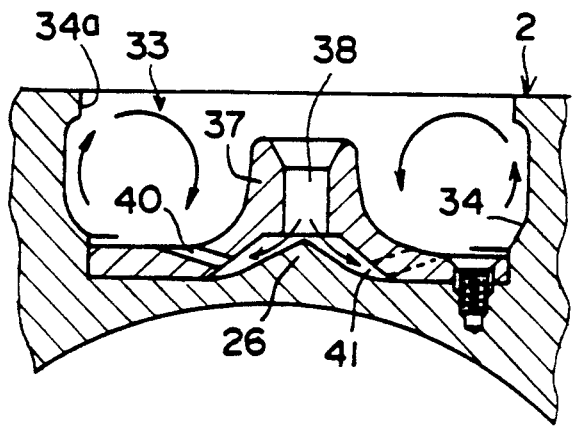
FIG. 8 is a front sectional view illustrating a combustion chamber in which the present invention is applied to a conventional engine piston.

While in the foregoing, a description has been made of a piston assembly having a construction shown in FIG. 1, it is to be noted that the invention can also be employed in a conventional piston pin connected assembly as shown in FIG. 8. In that case, an insert member 37 is disposed on the bottom of a piston body portion having a conical projecting portion 26. Together, the insert 37 and conical projection 26 form a flat auxiliary chamber 41. Fuel again is injected into the inlet port 38 in the center of the insert member 37. That fuel is fired in the auxiliary chamber 41 and combustion gases are directed by the outlet ports 40 against the peripheral wall portion 34 of the primary combustion chamber 33. Therefore, fuel adhered to the peripheral wall portion 34 is separated and burned.

Obviously, many modifications and variations of the present invention are possible in light of the above teachings. It is to be understood, therefore, that the invention can be practiced otherwise than as specifically described.

What is claimed is:

1. A piston for use in an internal combustion engine and comprising:
   an integrally formed central body portion including a side wall portion adapted for sliding engagement within a cylinder, a driven end adapted to receive combustion generated force, a connector end adapted for connection with a connecting rod, and an inner body portion between said driven end and said connector end; and
   an insert detachably secured to said inner body portion and having an outer surface at least partially defining a primary chamber adapted to receive fuel and accommodate combustion thereof and an inner surface defining with said inner body portion an auxiliary chamber, and wherein said insert further defines an inlet port means providing a fuel injection path between said primary and auxiliary chambers and outlet port means providing between said primary and auxiliary chambers a discharge path for combustion products generated by combustion in said auxiliary chamber.

2. A piston according to claim 1 wherein said primary chamber is partially defined by a cylindrical wall portion, said inlet port means comprises an inlet port extending between a central portion of said primary chamber and a central portion of said auxiliary chamber, and said outlet port comprises at least one outlet port, disposed to discharge combustion products from said auxiliary chamber toward said cylindrical wall portion.

3. A piston according to claim 2 wherein said outlet port means comprises a plurality of outlet ports each disposed to discharge combustion products from said auxiliary chamber toward said cylindrical wall portion.

4. A piston according to claim 3 wherein said outlet ports are oriented to discharge combustion products obliquely with respect to said cylindrical wall portion.

5. A piston according to claim 4 wherein said insert comprises a column portion projecting into a central portion of said primary chamber and defining said inlet port.

6. A piston according to claim 1 wherein said inner surface defines a first cavity, and said inner body portion defines a second cavity communicating with said first cavity to form said auxiliary chamber.

7. A piston according to claim 6 wherein said first cavity includes an annular first edge and said second cavity includes an annular second edge.

8. A piston according to claim 7 wherein said first and second edges are disposed in aligned engagement.

9. A piston according to claim 7 wherein said annular first edge encloses said annular second edge.

10. A piston according to claim 7 wherein said annular second edge encloses said annular first edge.

11. A piston according to claim 1 wherein said inner body portion includes a conical portion projecting into said auxiliary chamber.

* * * * *